US008952295B2

(12) United States Patent
Schaeffer et al.

(10) Patent No.: US 8,952,295 B2
(45) Date of Patent: Feb. 10, 2015

(54) WELDING WIRE WITH PEROVSKITE COATING

(75) Inventors: J. Ben Schaeffer, Lakewood, OH (US); Shitong Cao, Mayfield Hts., OH (US); Joel D. Kneisley, Perry, OH (US); Badri K. Narayanan, Columbus, OH (US)

(73) Assignee: Lincoln Global, Inc., City of Industry, CA (US)

( * ) Notice: Subject to any disclaimer, the term of this patent is extended or adjusted under 35 U.S.C. 154(b) by 166 days.

(21) Appl. No.: 12/141,621

(22) Filed: Jun. 18, 2008

(65) Prior Publication Data

US 2009/0314759 A1    Dec. 24, 2009

(51) Int. Cl.
| | |
|---|---|
| B23K 35/02 | (2006.01) |
| B23K 35/40 | (2006.01) |
| B23K 35/365 | (2006.01) |
| B23K 35/00 | (2006.01) |
| B23K 35/36 | (2006.01) |

(52) U.S. Cl.
CPC ............ B23K 35/00 (2013.01); B23K 35/0227 (2013.01); B23K 35/404 (2013.01); B23K 35/0244 (2013.01); B23K 35/365 (2013.01); B23K 35/0261 (2013.01); B23K 35/36 (2013.01)
USPC .................................................... 219/145.22

(58) Field of Classification Search
USPC ............. 219/145.22, 145.1, 146.31, 146.1, 219/145.31
See application file for complete search history.

(56) References Cited

U.S. PATENT DOCUMENTS

| | | | |
|---|---|---|---|
| 3,620,830 A | * | 11/1971 | Kramer ............... 219/145.23 |
| 3,767,888 A | | 10/1973 | Sullivan |
| 3,783,234 A | | 1/1974 | Russell |
| 4,197,362 A | | 4/1980 | Schmidberger et al. |
| 4,213,025 A | | 7/1980 | Kuhnen |
| 4,913,927 A | | 4/1990 | Anderson |
| 5,223,478 A | | 6/1993 | Whitlow et al. |
| 5,378,875 A | | 1/1995 | Hirama et al. |
| 5,426,094 A | | 6/1995 | Hull et al. |
| 5,550,348 A | | 8/1996 | Masaie et al. |
| 5,554,308 A | | 9/1996 | Masaie et al. |
| 5,672,287 A | | 9/1997 | Masaie et al. |
| 5,686,198 A | * | 11/1997 | Kuo et al. ............... 429/466 |
| 5,935,911 A | | 8/1999 | Yamada et al. |
| 5,981,444 A | | 11/1999 | Sawada et al. |

(Continued)

FOREIGN PATENT DOCUMENTS

| | | |
|---|---|---|
| EP | 1733838 | 12/2006 |
| GB | 502823 | 3/1939 |

(Continued)

OTHER PUBLICATIONS

Buhiyan, "Topical Review, Solution-derived Textured Oxide Thin Films-A Review", Superconductivity Science Technology, vol. 19, Institute of PHysics Publishing, Jan. 4, 2006.

(Continued)

*Primary Examiner* — Henry Yuen
*Assistant Examiner* — Ayub Maye
(74) *Attorney, Agent, or Firm* — Calfee, Halter & Griswold, LLP

(57) ABSTRACT

The electrical resistance between a welding wire used for arc welding and the welding gun contact tip through which it passes is reduced by providing on the surfaces of the welding wire a solid conductor comprising an electrically conductive perovskite or other thermally stable, electrically conductive particulate solid.

27 Claims, 6 Drawing Sheets

CONTACT TIP WEAR—COMPARATIVE EXAMPLE A

(56) References Cited

U.S. PATENT DOCUMENTS

| | | |
|---|---|---|
| 6,337,144 B1 | 1/2002 | Shimizu et al. |
| 6,346,566 B1 | 2/2002 | Yabe et al. |
| 6,696,170 B2 | 2/2004 | Kim et al. |
| 6,699,926 B2 | 3/2004 | Yabe et al. |
| 2003/0015511 A1 | 1/2003 | Kim et al. |
| 2005/0044687 A1 | 3/2005 | Matsuguchi et al. |
| 2005/0045699 A1 | 3/2005 | Konishi et al. |
| 2006/0255027 A1 | 11/2006 | Katiyar |
| 2006/0261054 A1 | 11/2006 | Katiyar |
| 2006/0278627 A1 | 12/2006 | Burt et al. |
| 2007/0158768 A1* | 7/2007 | Pilchowski et al. ............ 257/415 |
| 2007/0184324 A1 | 8/2007 | Lyons et al. |

FOREIGN PATENT DOCUMENTS

| | | |
|---|---|---|
| GB | 1538973 | 1/1979 |
| JP | 54-081138 | 6/1979 |
| JP | 55-128395 | 10/1980 |
| JP | 55128395 A * | 10/1980 ............ B23K 35/00 |
| JP | 02-098595 | 3/1990 |
| JP | 04-300095 | 10/1992 |
| JP | 05-023731 | 2/1993 |
| JP | 05-171463 | 7/1993 |
| JP | 05-287293 | 11/1993 |
| JP | 05-329683 | 12/1993 |
| JP | 06-106129 | 4/1994 |
| JP | 06-262389 | 9/1994 |
| JP | 06-277877 | 10/1994 |
| JP | 06-277880 | 10/1994 |
| JP | 06-285677 | 10/1994 |
| JP | 06-285678 | 10/1994 |
| JP | 06-306385 | 11/1994 |
| JP | 07-032186 | 2/1995 |
| JP | 07-097583 | 4/1995 |
| JP | 07-136796 | 5/1995 |
| JP | 07-136797 | 5/1995 |
| JP | 07-241694 | 9/1995 |
| JP | 07-251295 | 10/1995 |
| JP | 07-276089 | 10/1995 |
| JP | 08-019893 | 1/1996 |
| JP | 08-057650 | 3/1996 |
| JP | 08-099188 | 4/1996 |
| JP | 08-150494 | 6/1996 |
| JP | 08-151548 | 6/1996 |
| JP | 08-155671 | 6/1996 |
| JP | 08-155674 | 6/1996 |
| JP | 08-157858 | 6/1996 |
| JP | 08-192292 | 7/1996 |
| JP | 08-197278 | 8/1996 |
| JP | 08-206879 | 8/1996 |
| JP | 08-229697 | 9/1996 |
| JP | 08-243779 | 9/1996 |
| JP | 08-252691 | 10/1996 |
| JP | 08-257788 | 10/1996 |
| JP | 08-267284 | 10/1996 |
| JP | 08-281471 | 10/1996 |
| JP | 08-281480 | 10/1996 |
| JP | 08-290287 | 11/1996 |
| JP | 09-001391 | 1/1997 |
| JP | 09-059667 | 3/1997 |
| JP | 09-070684 | 3/1997 |
| JP | 09-070685 | 3/1997 |
| JP | 09-070691 | 3/1997 |
| JP | 09-071792 | 3/1997 |
| JP | 09-076089 | 3/1997 |
| JP | 09-122974 | 5/1997 |
| JP | 09-141489 | 6/1997 |
| JP | 09-141491 | 6/1997 |
| JP | 09-150292 | 6/1997 |
| JP | 09-206987 | 8/1997 |
| JP | 09-302374 | 11/1997 |
| JP | 09-323191 | 12/1997 |
| JP | 10-058183 | 3/1998 |
| JP | 10-146693 | 6/1998 |
| JP | 10-193175 | 7/1998 |
| JP | 11-005192 | 1/1999 |
| JP | 11-077373 | 3/1999 |
| JP | 11-104883 | 4/1999 |
| JP | 11-104887 | 4/1999 |
| JP | 11-147174 | 6/1999 |
| JP | 11-147194 | 6/1999 |
| JP | 11-147195 | 6/1999 |
| JP | 11-170082 | 6/1999 |
| JP | 11-197878 | 7/1999 |
| JP | 11-217578 | 8/1999 |
| JP | 11-254182 | 8/1999 |
| JP | 11-335685 | 12/1999 |
| JP | 2000-087058 | 3/2000 |
| JP | 2000-094178 | 4/2000 |
| JP | 2000-117486 | 4/2000 |
| JP | 2000-141080 | 5/2000 |
| JP | 2000-158185 | 6/2000 |
| JP | 2000-237894 | 9/2000 |
| JP | 2000-317679 | 11/2000 |
| JP | 2001-113390 | 4/2001 |
| JP | 2001-179481 | 7/2001 |
| JP | 2001-239393 | 9/2001 |
| JP | 2001-252786 | 9/2001 |
| JP | 2002-219595 | 8/2002 |
| JP | 2002-226880 | 8/2002 |
| JP | 2002-239779 | 8/2002 |
| JP | 2002-283096 | 10/2002 |
| JP | 2002-346787 | 12/2002 |
| JP | 2003-039191 | 2/2003 |
| JP | 2003-170293 | 6/2003 |
| JP | 2003-191092 | 7/2003 |
| JP | 2003-225794 | 8/2003 |
| JP | 2003-236694 | 8/2003 |
| JP | 2003-275893 | 9/2003 |
| JP | 2003-275894 | 9/2003 |
| JP | 2003-305587 | 10/2003 |
| JP | 2003-311475 | 11/2003 |
| JP | 2003320481 | 11/2003 |
| JP | 2004-001061 | 1/2004 |
| JP | 2004-025200 | 1/2004 |
| JP | 2004-034131 | 2/2004 |
| JP | 2004-058142 | 2/2004 |
| JP | 2004-098157 | 4/2004 |
| JP | 2004-141908 | 5/2004 |
| JP | 2004-195543 | 7/2004 |
| JP | 2004-202572 | 7/2004 |
| JP | 2004-237299 | 8/2004 |
| JP | 2004-314099 | 11/2004 |
| JP | 2005-074438 | 3/2005 |
| JP | 2005-074490 | 3/2005 |
| JP | 2005-095972 | 4/2005 |
| JP | 2005-205493 | 4/2005 |
| JP | 2005-246419 | 9/2005 |
| JP | 2006-095551 | 4/2006 |
| JP | 2006-095552 | 4/2006 |
| JP | 2006-095579 | 4/2006 |
| JP | 2006-102793 | 4/2006 |
| JP | 2006-102794 | 4/2006 |
| JP | 2006-102799 | 4/2006 |
| JP | 2006-102800 | 4/2006 |
| JP | 2006-175451 | 7/2006 |
| JP | 2006-175452 | 7/2006 |
| JP | 2006-224172 | 8/2006 |
| SU | 582932 | 12/1977 |

OTHER PUBLICATIONS

Perovskite—7 pgs. from http://wikis.lib.ncsu.edu/index.php/Perovskite, printed Oct. 5, 2007.

McEvoy, "Materials for high-temperature oxygen reduction in solid oxide fuel cells", J. of Materials Science, 36, pp. 1087-1091, 2001.

Melfi et al., "Causes and Prevention of Copper Cracking in Saw Pipe Seam Welds", copyright 2004, Rio Pipeline 2005 Conference & Exposition, pp. 1-5.

Pena et al., "Chemical Structures and Performance of Perovskite Oxides", Chem. Rev. 101 (7), 75 pgs, 2001.

Shimzu et al., "Wear Mechanism in Contact Tube", Science and Technology of Welding and Joining, vol. 11, No. 1, 2006, pp. 94-105.

(56) References Cited

OTHER PUBLICATIONS

Zahid et al., Electrical conductivity of perovskites in the quasi-ternary system La[0.8]Sr[0.2]MnO[3]-La[0.8]Sr[0.2]CoO [3]-La[0.8]Sr[0.2]FeO[3] for application as cathode-interconnect contact layer in SOFC, Proceedings—Electrochemical Society, vol. 7 (2), pp. 1708-1716.
Walck et al., "Characterization of air-annealed, pulsed laser deposited ZnO-WS2 solid film lubricants by transmission electron microscopy", Thin Solid Films, 305, pp. 130-143, 1997.
ExxonMobil Material Safety Data Sheet, Product Name: Mobil Velocite Oil No. 10, revision Date Nov. 1, 2006, 8 pgs.
Lubrizol Material Safety Data Sheet, 5979A, Code A678, 6 pgs. Mar. 2, 2005.
Lubrizol Metalworking Additives, one page, http://www.lubrizol.com/products/metalworking/default.asp; printed Jan. 22, 2008.
Mobil Velocite Oil Numbered Series, Spindle and Hydraulic Oils, two pages, printed Jan. 22, 2008, http://www.mobile.com/USA-English/Lubes/PDS/GLXXENINDMOMobil_Velocite_Oil_ . . .
Sasol North America, Material Safety Data Sheet, 154L Specialty Alkylate, A714, printed Jan. 11, 2005, 7 pgs., version 1.5.
Sasol North America, Technical Data Sheet, V-154L Specialty Alkylate, 7 pgs., version 1.5, printed Jan. 11, 2005.
Sasol North America, Material Safety Data Sheet, 9050 Specialty Alkylate, printed Jan. 11, 2005, 7 pgs, version 1.4.
Sasol North America, Technical Data Sheet, V-3060L-B Specialty Alkylate, 7 pgs., version 1.3, printed Jan. 11, 2005.
Tejuca, et al., Marcel Dekker, Inc., NY, 1993, "Properties and Applications of Perovskite-Type Oxides", Chapter 1, pp. 1-23 by Twu et al., "Preparation of Bulk and Supported Perovskites", Chapter 3, "by D.M. Smyth, pp. 47-72, Oxidative Nonstoichiometry in Perovskite Oxides", and Chapter 9, pp. 195-214, by J.L.G. Fierro, "Composition and Structure of Perovskite Surfaces".
Perovskite—one page from Wikipedia, printed Oct. 5, 2007, http://en.wikipedia.org/wiki/Perovskite.
International Search Report and Written Opinion from PCT/IB09/005860 dated Aug. 20, 2009.
International Search Report from PCT/IB09/005865 dated Sep. 21, 2009.
Written Opinion from PCT/IB09/005865 dated Sep. 21, 2009.
Sasol North America, Technical Data Sheet, V-159L Specialty Alkylate, 7 pgs. version 1.4 dated Jan. 11, 2005.
Office action from U.S. Appl. No. 12/141,654 dated Apr. 6, 2012.
Office action from U.S. Appl. No. 12/141,654 dated Aug. 23, 2013.
Office action from U.S. Appl. No. 12/141,654 dated Nov. 28, 2012.
Office action from European Application No. 09766180.5 dated Apr. 28, 2012.
Response from U.S. Appl. No. 12/141,64 dated Sep. 6, 2012.
Office communication from U.S. Appl. No. 12/141,654 dated Apr. 29, 2013.
Office action from U.S. Appl. No. 12/141,654 dated Nov. 21, 2013.
Advisory action from U.S. Appl. No. 12/141,654 dated Dec. 2, 2013.
Twu, et al., "Preparation of Bulk and Supported Perovskites", Chapter 1, pp. 1-23 (1993), from Properties and Applications of Perovskite-type Oxides.
Smyth, "Oxidative Nonstoichiometry in Perovskite Oxides", Chapter 3, pp. 47-72 (1993), from Properties and Applications of Perovskite-type Oxides.
Kamimura, "Theory of Copper Oxide Superconductors", 2005, Springer Verlag, Berlin, 10 pgs., front/back cover and table of contents.
Fierro, "Composition and Structure of Perovskite Surfaces", Chapter 9, pp. 195-214 (1993), from Properties and Applications of Perovskite-type Oxides.
Notice of Allowance from U.S. Appl. No. 12/141,654 dated Jul. 24, 2014.

\* cited by examiner

CONTACT TIP WEAR—COMPARATIVE EXAMPLE A

CONTACT TIP WEAR—COMPARATIVE EXAMPLE B

CONTACT TIP WEAR—COMPARATIVE EXAMPLE C

CONTACT TIP WEAR—EXAMPLE 1

Box-Plot: Voltage Drop from Contact to Welding Wire

Box-Plot: Voltage Drop from Contact to Welding Wire

WELDING WIRE WITH PEROVSKITE COATING

BACKGROUND AND SUMMARY

Welding wires commonly used for GMAW (Gas Metal Arc Welding) and SAW (Submerged Arc Welding) typically carry a copper metal coating (cladding) to reduce friction and electrical resistance between the welding wire and the welding gun's contact tip through which the welding wire passes. In contrast, FCAW (Flux-Cored Arc Welding) welding wires typically carry a wire feeding lubricant comprising a solid lubricant such as $MoS_2$, $WS_2$, graphite and/or PTFE (Teflon) for this purpose. A binder such as vegetable oil, mineral oil, synthetic oil or petroleum wax is included in the wire feeding lubricant for adhesion purposes and to enhance feedability, i.e., the ease of withdrawing the wire from its supply container and feeding the wire through the contact tip without tangling. Arc stabilizers, which are typically sodium or potassium containing soaps or detergents, etc., can also be dissolved and/or dispersed in the binder. See, for example, Kokai (Japanese Published Unexamined Application) 2004-034131, Kokai 08-257788, Kokai 2002-219595, Kokai 2002-239779, U.S. Pat. No. 6,337,144 and Kokai 2003-039191, the disclosures of which are incorporated herein by reference.

In accordance with this invention, the electrical resistance between a welding wire and the welding gun's contact tip is substantially reduced by providing on the welding wire's surface a thermally stable, electrically conductive solid in fine particulate form. The result, it is believed, is that arc stability will be improved and the useful life of the contact tip will be increased.

Thus, this invention in its broader aspects provides a welding wire for use in arc welding comprising a welding wire substrate and a solid conductor on the surfaces of the welding wire substrate, the solid conductor comprising a thermally stable, electrically conductive particulate solid.

In a particular embodiment, this invention provides a welding wire comprising a welding wire substrate and a wire coating on the outside surfaces of the welding wire substrate, the wire coating comprising a solid lubricant, a solid conductor comprising a thermally stable, electrically conductive particulate solid, and a binder.

In addition, this invention also provides an improved welding wire coating comprising a solid lubricant, a solid conductor comprising a thermally stable, electrically conductive particulate solid, and a binder.

DETAILED DESCRIPTION

Figure 1:
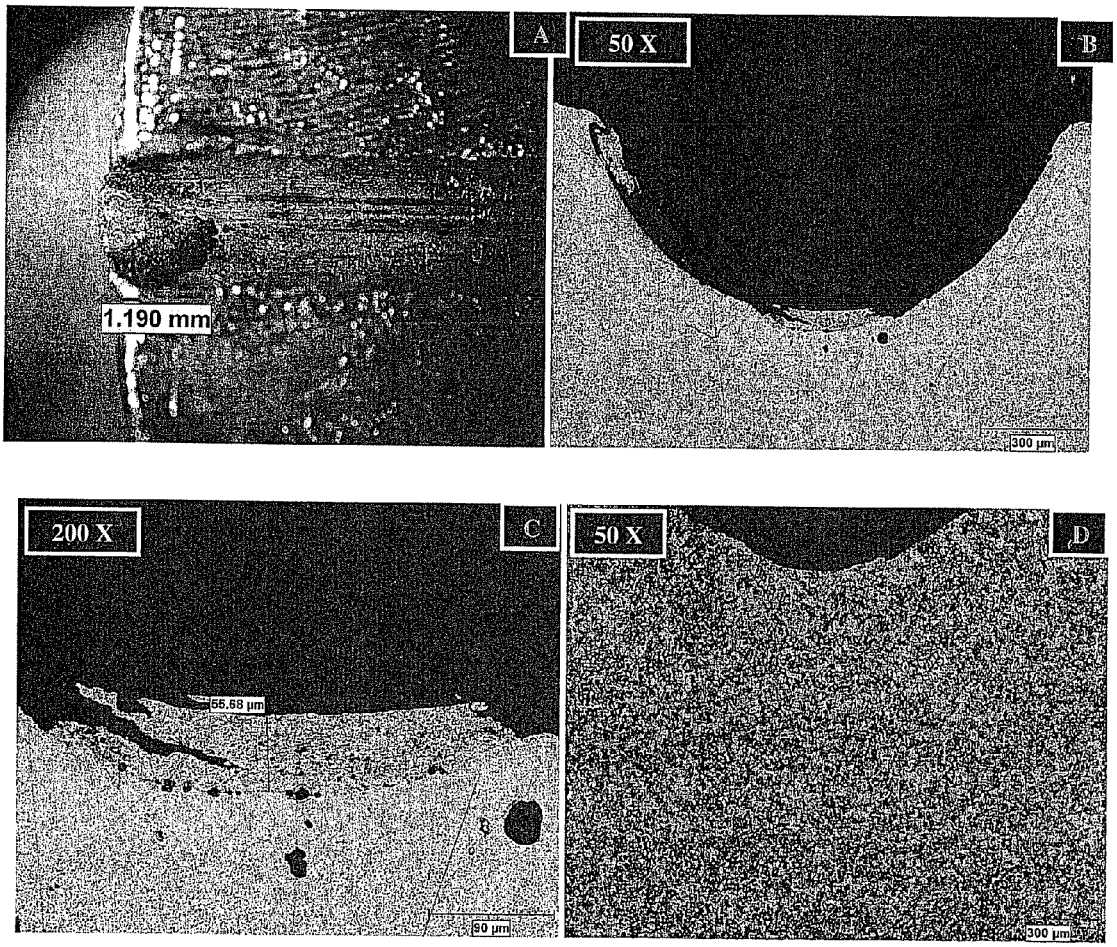
FIGS. 1A, 2A, 3A and 4A are photomicrographs of axial sections of four different welding gun contact tips used in certain experimental welding tests conducted in accordance with the following Example 1 and Comparative Examples A-C of this specification.
FIGS. 1B, 2B, 3B and 4B; 1C, 2C, 3C and 4C; and 1D, 2D, 3D and 4D are photomicrographs of respective radial cross-sections taken at different location in the four different welding gun contact tips of these working examples.

In accordance with this invention, a thermally stable, electrically conductive solid in fine particulate form is provided on the surfaces of a welding wire used for arc welding for reducing the electrical resistance between the welding wire and the welding gun's contact tip through which the welding wire passes.

Wire Substrate

This invention is applicable to any type of welding wire previously used, or that may be used in the future, in any type of arc welding process including but not limited to GMAW (Gas Metal Arc Welding), SAW (Submerged Arc Welding) and FCAW (Flux-Cored Arc Welding). Welding wire made for GMAW and SAW in accordance with this invention will most commonly be a solid core metal wire, i.e., a wire comprising a solid mass of metal of essentially uniform composition, which is both "clean," i.e., not coated with any type of lubricant, binder or other ingredient commonly included in conventional welding wire coatings, and "unclad," i.e., not clad or otherwise coated with copper or any other metal or metal alloy ("bare metal wire"). Such wires are most commonly made from carbon (mild) steel, although they can also be made from a variety of other metals and metal alloys such as stainless steels including austenitic, martensitic, ferritic and duplex stainless steels, low CTE alloys such as Invar and Kovar, and nickel-based superalloys such as Inconel, etc. In addition, they can also be clad with copper or any other metal, if desired, although this is generally unnecessary in accordance with the present invention. Similarly, they can also be coated with conventional feeding lubricants and other conventional ingredients as would occur, for example, if the wire substrate to which the inventive wire coating composition is applied is a typical commercially available "bare metal wire," which normally carries some type of wire feeding lubricant.

Normally, welding wire for GMAW will have a diameter of about 1/16 inch (~1.6 mm) or less, while welding wire for SAW will have a diameter of about 1/16 inch (~1.6 mm) or more. SAW welding wire with diameters of at least about 2 mm, at least about 3 mm, and even at least about 4 mm, are not uncommon.

When this invention is used for making flux-cored welding wires, any type of welding flux can be included in the wire's core. Although such flux-cored welding wires will normally be unclad, they can be clad with copper or any other metal or metal alloy, as desired.

Solid Lubricant and Binder

Although the solid conductor of this invention can be used alone, it will normally be combined with other materials typically applied to the surfaces of bare metal welding wire for enhancing lubricity, feedability, arc stability and/or other properties. So, for example, in some embodiments of this invention the solid conductor can be a part of a welding wire coating including a solid particulate lubricant such as $MoS_2$, $WS_2$, ZnO (normally together with $WS_2$), graphite and/or PTFE (Teflon) as well as a binder such as vegetable oil, mineral oil, synthetic oil, petroleum wax or the like. For this purpose, any solid lubricant which has previously been used, or which may be used in the future, for enhancing the lubricity between a welding wire and the equipment through which it is fed can be used in this invention. Similarly, any binder which has previously been used, or which may be used in the future, for promoting adhesion between such solid particles and the welding wire surfaces to which they adhere can be used in this invention. See the various domestic and foreign patent documents cited above for an extensive disclosure of the different types of solid lubricants and binders typically used for making conventional feeding lubricants.

In other embodiments of this invention, the solid conductor can be combined with a suitable binder, as described above, without a solid lubricant also being present.

In addition to the solid lubricants and binders discussed above, other ingredients included in conventional welding wire lubricants such as arc stabilizers and the like can also be included in the welding wire coatings of this invention.

Solid Conductor

In accordance with this invention, the electrical resistance between a welding wire used for arc welding and the welding gun's contact tip is reduced during welding by providing on the surfaces of the welding wire a solid conductor comprising a thermally stable, electrically conductive solid in fine particulate form. In this context, "thermally stable" means that the solid conductor remains solid (e.g., does not melt) and, in addition, is essentially unreactive in air at 1,200° C., as determined by TGA (Thermal Gravimetric Analysis) according to ASTM E2550-07. Solid conductors which are thermally stable at 1,350° C., 1,500° C., and even 1,600° C., are more interesting. In this regard see, for example, Shimizu et al., Wear Mechanism in Contact Tube, *Science and Technology of Welding and Joining*, Vol. 11, No. 1, 2006, pp 94-105, which indicates that graphite oxidizes at welding temperatures and hence is not "thermally stable" in the context of this disclosure.

In addition to being thermally stable, the solid conductors used in this invention are also electrically conductive. In this context, "electrically conductive" means that the solid conductor has an electrical conductivity, σ, of at least 10 S/cm (Siemens per centimeter) at 800° C., as determined by ASTM B193-02. Solid conductors with electrical conductivities at 800° C. of at least about 50 S/cm, at least about 75 S/cm and at least about 90 S/cm are more interesting. Solid conductors with electrical conductivities at 800° C. of at least about 200 S/cm, at least about 300 S/cm, at least about 400 S/cm, at least about 500 S/cm, and even at least about 1000 S/cm are contemplated.

As a result of providing a thermally stable, electrically conductive solid conductor on the surfaces of a welding wire in accordance with this invention, the electrical resistance between the welding wire used and the contact tip of the welding gun through which the welding wire passes during arc welding is reduced. This, in turn, results is a corresponding reduction in Joule heating of the contact tip, it is believed. This should lead to a significant decrease in the rate of contact tip wear due to excessive heating, and hence a corresponding increase in contact tip useful life. This, in turn, is a significant benefit in robotic welding where "down time" is very costly.

Any solid material which is thermally stable and electrically conductive, and which can also be provided in fine, particulate form, can be used as the solid conductor of this invention. The particle size of the solid conductor is not critical, and essentially any particle size can be used. Generally speaking, the particle size of the solid conductor should be small enough so that it will adhere to the wire substrate surface with the particular binder selected and large enough so that the cost of obtaining the solid conductor does not become prohibitively expensive. In practical terms, this means that the average particle size of the solid conductor will normally be about 40 microns or less. Average particle sizes on the order of about 20 microns or less, about 10 microns or less, about 5 microns or less or even 2 microns or less are more interesting.

Moreover, while any thermally stable solid which has an electrical conductivity, σ, of at least about 10 S/cm (Siemens per centimeter) at 800° C. can be used as the solid conductor of this invention, those exhibiting electrical conductivities, σ, of at least about 25 S/cm at 800° C. are more interesting, while those exhibiting electrical conductivities, σ, of at least about 50 S/cm, at least about 75 S/cm, or even at least about 100 S/cm, at 800° C. are even more interesting. Thermally stable solids with even higher electrical conductivities, such as at least about 200 S/cm, at least about 300 S/cm, at least about 400 S/cm, at least about 500 S/cm, at least about 700 S/cm, or even at least about 1,000 S/cm, at 800° C. are contemplated. See, Table 1 below which identifies particular thermally stable solids with electrical conductivities at these and even higher levels.

One class of solid materials which can be used for this purpose are the electrically conductive perovskites. "Perovskite" refers to a general group of crystalline mixed metal oxides whose basic chemical formulas follows the pattern $ABO_3$. Common A-cations in perovskites are the rare earths, alkaline earths, alkalis and other large cations such as $Pb^{+2}$ and $Bi^{+3}$, with the following cations being more common: $Na^+$, $K^+$, $Rb^+$, $Ag^+$, $Ca^{+2}$, $Sr^{+2}$, $Ba^{+2}$, $Pb^{+2}$, $La^{+3}$, $Pr^{+3}$, $Nd^{+3}$, $Bi^{+3}$, $Ce^{+4}$ and $Th^{+4}$. Common B cations in perovskites include: $Li^+$, $Cu^{+2}$, $Mg^{+2}$, $Ti^{+3}$, $V^{+3}$, $Cr^{+3}$, $Mn^{+3}$, $Fe^{+3}$, $Co^{+3}$, $Ni^{+3}$, $Rh^{+3}$, $Ti^{+4}$, $Mn^{+4}$, $Ru^{+4}$, $Pt^{+4}$, $Nb^{+5}$, $Ta^{+5}$, $Mo^{+6}$ and $W^{+6}$.

The crystal structure of perovskites can be regarded as a primitive cube, with larger A-cations occupying the middle of the cube, smaller B-cations occupying the corners, and the oxygen anions occupying the center of the cube's edges. The structure is stabilized by the 6 coordination of the B-cation (octahedron) and 12 of the A-cation. The packing of the ions can be thought of the A and O ions together form a cubic closed packed array, where the B ions occupy a quarter of the octahedral holes.

Although a primitive cube is the idealized structure, differences in radii between the A and B cations can alter the structure to a number of different so-called distortions, of which tilting is the most common one. With perovskite tilt the BO6 octahedron twists along one or more axes to accommodate the difference.

Complex perovskite structures may contain two or more different A-cations, two or more different B-cations, or both. This normally results in ordered and disordered variants. Such complex perovskites crystal can also exhibit a stoichiometric excess or deficiency of oxygen atoms, especially when the crystal contains multiple A-cations (or B-cations) having different valence states from one another. Thus, complex perovskites can also be viewed as corresponding to the formula $A_{1-x}A'_xB_{1-y}B'_yO_z$, where z can vary above and below 3 so as to satisfy the valence states of the other elements present. Note, also, that sometimes complex perovskites are described with formulas such as $Y_1Ba_2Cu_3O_{7-\delta}$ in which the oxygen subscript varies around 6, rather than 3 as in the case of $ABO_3$. However, this is merely semantics, as $Y_1Ba_2Cu_3O_6$ is equivlant to $Y_{0.5}Ba_1Cu_{1.5}O_3$.

For a general description of perovskites, see Tejuca, et al., *Properties and Applications of Perovskite-type Oxides*, © Marcel Dekker, Inc., New York, 1993; Bhyiyan, "TOPICAL REVIEW, Solution-derived Textured Oxide Thin Films-A Review," *Superconductivity Science Technology*, Vol. 19, Institute of Physics Publishing, Jan. 4, 2006; H. Kamimura, *Theory of Copper Oxide Superconductors*, 2005, Springer-Verlag, Berlin; Pena, *Chemical Structures of Pemformce of Perovskie Oxides*, Chem. Rev., 101 (7), 1981-2018, 2001, 10.1021/cr980129f S0009-2665(98)001129-0, Web Release Date: May 31, 2001; and McEvoy, *Materials for High-temperature Oxygen reduction in Solid Oxide Fuel Cells*, Journal of Materials Science, Vol. 36, pp 1087-1091, 2001.

Being ceramics, perovskites are thermally stable. In addition, as a class they show widely varying electrical conductivities. Some are dielectric, i.e., electrically insulating, while others conduct electricity like metals. Many are semiconductors, i.e., solids whose electrical conductivities are normally in between that of a dielectric and a conductor but which can be controlled over a wide range, either permanently or dynamically.

Electrically conductive perovskites are well known and used in a number of different electrical applications where good electrical conductivity at high temperatures is required. For example, they are widely used to form the cathodes of solid oxide fuel cells (SOFC). See, for example, the above-noted McEvoy article.

An interesting class of perovskites for this purpose is described as corresponding to the formula $ABO_x$, where A is at least one of La, Ce, Pr, Sm, Nd, Gd and Y; B is at least one of Ga, Mg, Mn, Fe, Cr, Co, Cu, Zn and Ni; and x is 2.5-3.2; wherein A may optionally be partially substituted with one or more of Sr, Ba and Ca. In this context, "partially substituted" means that up to 50 atom % of the A atoms can be replaced by the indicated substitutes, so long as the ratio of the total amount of A atoms plus substituents to the total amount of B atoms is preserved. Perovskites of this type in which A is substituted with at least 5 atom %, at least 10 atom %, or even at least 15 atom % t, of the indicated substituents are interesting.

Particular examples of electrically conductive perovskites include all of those perovskites which have been disclosed, or may be disclosed in the future, as useful in making electrodes for solid oxide fuel cells. Examples include $LaMnO_3$, $CaMnO_3$, $LaNiO_3$, $LaCoO_3$, $LaCrO_3$, etc. $LaMnO_3$ doped with strontium is particularly interesting. Other examples include $LaAlO_3$, $GdFeO_3$, $SrTiO_3$, $BaCeO_3$, $Ba_xSr_{1-x}TiO_3$, $BaZrO_3$, $BaSnO_3$, $BaZr_{0.3}Ti_{0.65}O_3$, $La_{1-x}Ca_xMnO_3$, $LaNiO_3$, $(Pb,Sr)TiO_3$, $[Pb(SC_{0.5}Nb_{0.5})]_xTi_{1-x}O_3$, $Pb_{1-x}Ca_xTiO_3$, $PbTiO_3$, $Pb(Yb,Nb)TiO_3$, $PbZrO_3$, $Pb(Zr,Ti)O_3$ and $SrRuO_3$. It is also well-known that these materials can be doped with a wide variety of different doping elements including, but not limited to, Y, Hg, Tl and the lanthanide elements (La through Yb). See, the Bhyiyan article cited above.

Additional specific examples of useful perovskites, including their electrical conductivities, are set forth in the following Table 1:

In addition to perovskites, other thermally stable, electrically conductive solid materials capable of being supplied in fine particulate form can be used as the solid conductors of this invention. Examples include the lanthanum nickelates such as shown in U.S. Published Application 2007/0184324 and materials exhibiting the pyrochlore structure ($A_2B_2O_7$) such as $La_2Zr_2O_7$, $Gd_2Zr_2O_7$, $Eu_2Nb_2O_7$, $Gd_2Nb_2O_7$, $Sm_2Nb_2O_7$, $Ho_2Nb_2O_7$, $Y_3NbO_7$ and $Yb_3NbO_7$.

The amount of solid conductor on the surfaces of the wire substrate can vary widely, and essentially any amount can be used. In general, enough solid conductor should be used to provide a noticeable decrease in electrical resistance between the welding wire and the contact tip of the weld gun through which it passes during welding but not so much that handling of the welding wire becomes difficult. Thus, solid conductor loadings on the order of 0.001 to 10 gms/m$^2$ of wire surface area, or 0.01 to 1 gm/m$^2$, or even 0.05 to 0.5 gm/m$^2$ can be used.

In some embodiments of this invention as indicated above, the solid conductor is combined with a liquid or solid organic binder such as vegetable oil, mineral oil, synthetic oil or petroleum wax in a suitable amount for adhesion purposes without a solid lubricant being present. In this case, the welding wire coating thereby provided can be viewed as normally containing about 1 to 50 wt. % solid conductor, more commonly about 2 to 25 wt. % solid conductor, about 5 to 15 wt. % solid conductor, or even about 7 to 13 wt. % solid conductor, based on the weight of the entire wire coating.

In other embodiments of this invention as indicated above, the welding wire coating will include both the solid conductor of this invention as well as a solid lubricant such $MoS_2$, $WS_2$, graphite, ZnO and/or PTFE (Teflon). In these instances, the solid conductor of this invention can be present in a weight ratio as low as 1:10 to as high as 10:1, based on the weight of the solid lubricant. Relative weight ratios of 5:1 to 1:5, 2:1 to 1:2, 1.5:1 to 1:1.5 and even about 1:1 are possible. Normally, such coatings will also include a liquid or solid organic binder such as vegetable oil, mineral oil, synthetic oil or petroleum wax in a suitable amount for adhesion purposes. In this case, the welding wire coating can be viewed as containing about 1

TABLE 1

Selected Perovskites including Electrical Conductivities at 800° C. in Siemens/Centimeter

| Composition | EC, S/cm | Composition | EC, S/cm |
|---|---|---|---|
| $Sr_{0.9}Ce_{0.1}CoO_{3-x}$ | 295 | $La_{0.9}Sr_{0.1}Ga_{0.8}Mg_{0.2}O_{2.85}$ | 0.1 |
| $Sr_{0.9}Ce_{0.1}FeO_{3-x}$ | 29 | $La_{0.9}Sr_{0.1}(Ga_{0.9}Co_{0.1})_{0.8}Mg_{0.2}O_{3-x}$ | 0.1 |
| $Sr_{0.85}Ce_{0.15}Fe_{0.8}Co_{0.2}O_{3-x}$ | 39 | $La_{0.8}Sr_{0.2}Ga_{0.8}Mg_{0.2}O_{3-x}$ | 0.1 |
| $Sr_{0.9}Ce_{0.1}Fe_{0.8}Ni_{0.2}O_{3-x}$ | 87 | $La_{0.9}Sr_{0.1}(Ga_{0.9}Cr_{0.1})_{0.8}Mg_{0.2}O_{3-x}$ | |
| $Sr_{0.7}Ce_{0.3}MnO_{3-x}$ | 251* | $Pr_{0.8}Sr_{0.2}Fe_{0.8}Co_{0.2}O_{3-x}$ | 76 |
| $Sr_2FeNbO_6$ | | $Pr_{0.8}Sr_{0.2}Mn_{0.8}Co_{0.2}O_{3-x}$ | 83 |
| $SrCo_{0.8}Fe_{0.2}O_{3x}$ | | $Pr_{0.65}Sr_{0.3}MnO_{3-x}$ | 209 |
| $La_{0.3}Sr_{0.7}CoO_{3-x}$ | 912 | $Pr_{0.7}Sr_{0.3}Mn_{0.8}Co_{0.2}O_{3-x}$ | 200 |
| $La_{0.5}Sr_{0.5}CoO_{3-x}$ | 1349 | $Pr_{0.75}Sr_{0.2}Mn_{0.8}Co_{0.2}O_{3-x}$ | 95 |
| $La_{0.6}Sr_{0.4}CoO_{3-x}$ | 1585 | $NdCoO_{3-x}$ | 398 |
| $La_{0.6}Sr_{0.4}FeO_{3-x}$ | 129 | $Nd_{0.9}Sr_{0.1}CoO_{3-x}$ | 794 |
| $La_{0.65}Sr_{0.3}MnO_{3-x}$ | 102 | $Nd_{0.8}Sr_{0.2}CoO_{3-x}$ | 1000 |
| $La_{0.65}Sr_{0.35}Fe_{0.8}Co_{0.2}O_{3-x}$ | 158 | $Nd_{0.7}Sr_{0.3}CoO_{3-x}$ | 1585 |
| $La_{0.6}Sr_{0.4}Fe_{0.8}Co_{0.2}O_3$ | 302 | $Nd_{0.6}Sr_{0.4}CoO_{3-x}$ | 1995 |
| $La_{0.6}Sr_{0.4}Fe_{0.5}Co_{0.5}O_3$ | 490 | $Nd_{0.5}Sr_{0.5}CoO_{3-x}$ | 2512 |
| $La_{0.6}Sr_{0.4}Fe_{0.2}Co_{0.8}O_3$ | 269 | $NdMnO_3$ | 25** |
| $La_{0.8}Sr_{0.2}Co_{0.1}Fe_{0.9}O_{3-x}$ | 32 | $Nd_{0.85}Sr_{0.15}MnO_{3-x}$ | 112** |
| $La_{0.8}Sr_{0.2}Co_{0.2}Fe_{0.8}O_{3-x}$ | 87 | $Nd_{0.7}Sr_{0.3}MnO_{3-x}$ | 200** |
| $La_{0.8}Sr_{0.2}Co_{0.8}Fe_{0.2}O_{3-x}$ | 1000 | $Nd_{0.6}Sr_{0.4}MnO_{3-x}$ | 281** |
| $La_{0.8}Sr_{0.2}Co_{0.5}Fe_{0.5}O_{3-x}$ | 355 | $Nd_{0.5}Sr_{0.5}MnO_{3-x}$ | 316** |
| $La_{0.75}Sr_{0.2}Mn_{0.8}Co_{0.2}O_{3-x}$ | 79 | | |

*Electrical Conductivity at 600° C.
**Electrical Conductivity at 700° C.

to 20 wt. % solid lubricant and about 1 to 20 wt. % thermally stable solid conductor. More interesting are those welding wire coatings containing about 4 to 15 wt. % solid lubricant and about 4 to 15 wt. % thermally stable solid conductor. Welding wire coatings containing about 6 to 11 wt. % solid lubricant and about 6 to 11 wt. % thermally stable solid conductor are even more interesting.

In general, such compositions (i.e., with or without solid lubricant) will normally contain about 60 to 98 wt. % binder, more commonly about 70 to 92 wt. % binder, and even about 78 to 88 wt. % binder.

EXAMPLES

In order to more thoroughly describe this invention, the following working examples were conducted.

In each example, a 0.045 inch (~1.1 mm) diameter solid mild steel bare metal welding wire was welded in the 1F position ("bead-on-plate") to form a weld on a 0.375 inch (~9.5 mm) thick plate of shot-blasted mild steel using a PowerWave 455 automatic welding machine available from Lincoln Electric of Cleveland, Ohio. The welding wire was fed through the machine at a speed of 450 inches per minute (~1143 cm/min.), while the machine was operated at a constant voltage of 31 Volts and an amperage of about 340 Amps, using a constant stick-out of 0.75 inch (~19.1 mm).

Each welding test lasted 60 seconds. Thereafter, the contact tip of the welding gun was removed from the machine and sectioned axially and radially so that the contact surface of the contact tip, i.e., the surface of the orifice in the contact tip through which the welding wire passes, at the outer end of the contact tip could be inspected visually. In addition, one of the sections was also etched with a suitable reagent so that the microstructure of the alloy forming the contact tip at this location could also be determined visually.

At least four, and sometimes five, runs were made for each example, with the most representative run for each example being selected for discussion below:

Comparative Example A

In this example, the welding wire used was a conventional copper clad mild steel welding wire coated with a conventional water-based organic feeding lubricant commonly used on copper coated welding wire ("standard copper lubricant" or "copper lube"). The results obtained are shown in the photomicrographs of FIGS. 1A, 1B, 1C and 1D.

As shown in FIG. 1A, which is an axial cross section, a relatively short wear scar ~1 mm long was produced. Meanwhile, FIGS. 1B and 1C, which are radial sections through this wear scar, show that amounts of additional copper, which are presumably derived from the copper cladding of the welding wire, deposited on the contact surface of the contact tip.

Finally, FIG. 1D, which is an axial section similar to FIG. 1B showing the microstructure of the alloy forming the contact tip, shows an essentially uniform, small grain structure throughout the metal mass defining the contact surface. This indicates that the contact tip's temperature, at the point of electrical contact during welding, did not exceed the softening point of the copper alloy forming the contact tip.

Comparative Example B

In this example, the welding wire used was the same mild steel welding wire used in Comparative Example A except that its copper cladding was omitted. In addition, this welding wire was coated with a non-aqueous organic feeding lubricant commonly used on bare steel (non-copper clad) welding wire comprising a mixture of commercially available synthetic oils and a commercially available arc stabilizer ("standard bare wire lubricant" or "bare wire lube"). The results obtained are shown in the photomicrographs of FIGS. 2A, 2B, 2C and 2D.

Figure 2:
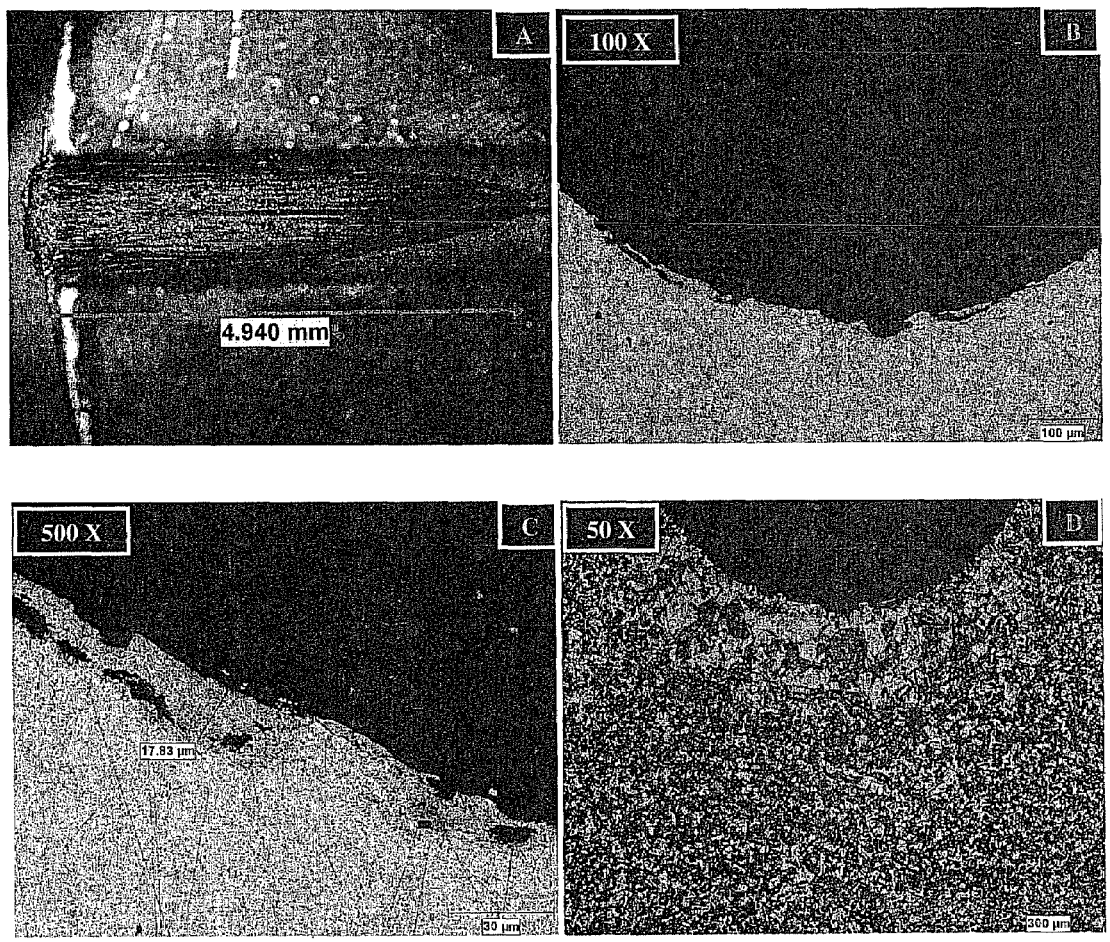

As shown in FIG. 2A, a weld scar ~5 mm long was produced, thereby indicating that a much larger area of the contact tip was affected than occurred in Comparative Example A. Meanwhile, FIGS. 2B and 2C show that, throughout the area of this weld scar, a roughened contact surface about 10 μm thick was produced, which is believed due not only to removal of copper but also to the deposition of a relatively continuous layer of fused steel in this area.

Finally, FIG. 2D shows that large grains were produced in the metal of the contact tip in this area, thereby indicating that the contact tip's temperature at this location exceeded the softening point of the metal.

Comparative Example C

In this example, the same welding wire used in Comparative Example B (no copper cladding but coated with standard bare wire lubricant) was overcoated with a mixture comprising 5.0 wt. % particulate $WS_2$, 1.7 wt. % particulate ZnO and 2.5 wt. % particulate graphite dispersed in 90.8 wt. % of an organic binder comprising the standard bare wire lubricant mentioned above.

Figure 3:
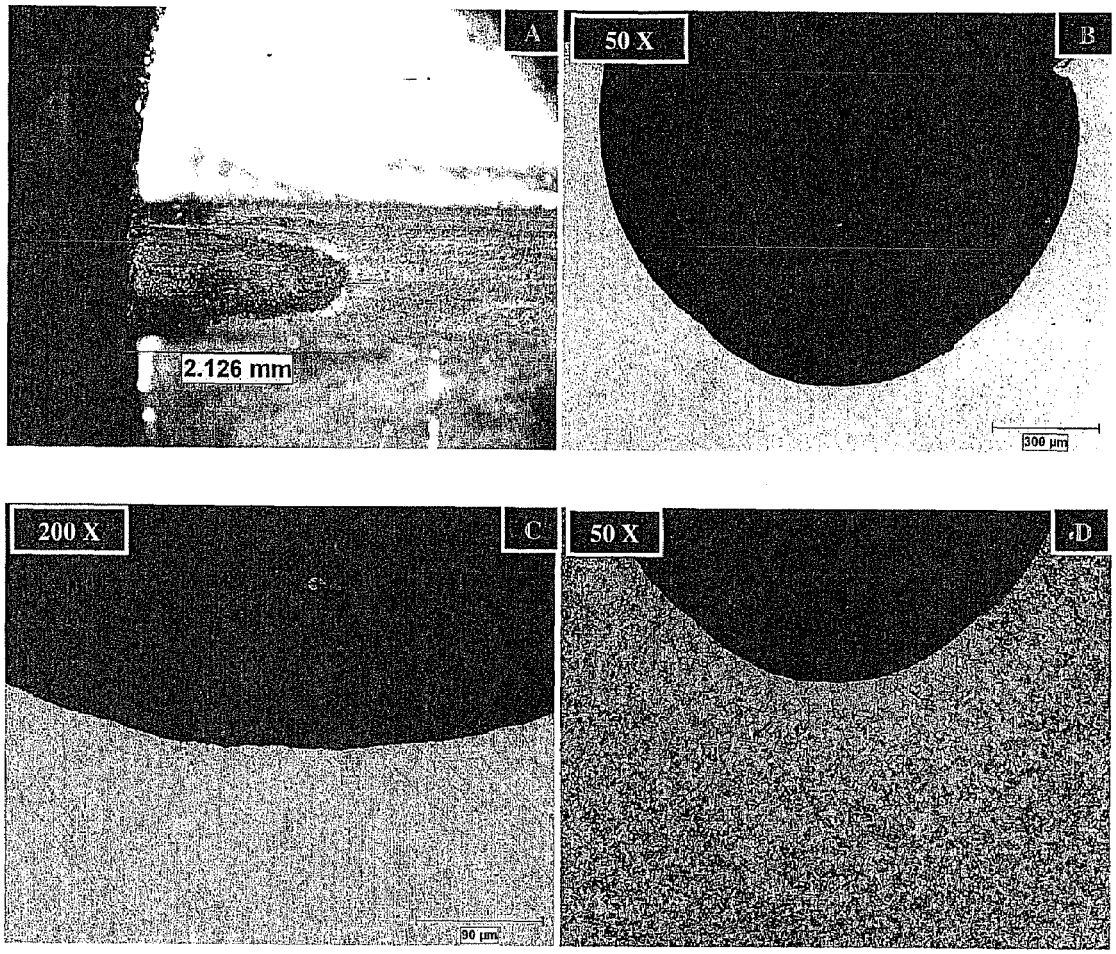

As shown in FIG. 3A, a weld scar ~2 mm long was produced, thereby indicating that the area of the contact tip that was affected was larger than in Comparative Example A but smaller than in Comparative Example B. FIG. 3A also shows that some small particles of an unknown material were deposited on the contact surface outside of, but near, the area of the wear scar. Meanwhile, FIGS. 3B and 3C show that the contact surface remained smooth and free of any added material such as the roughened steel layer of the bare metal wire of Comparative Example B.

Finally, FIG. 3D shows a few large grains being present in the microstructure of the metal forming the contact surface, thereby indicating at least some localized heating to above the softening point in these areas.

Example 1

In this example, the same welding wire used in Comparative Example B (no copper cladding but coated with standard bare wire lubricant) was overcoated with a mixture comprising 8.4 wt. % particulate $WS_2$ and 8.4 wt. % of an "LSM" solid conductor comprising a perovskite of the formula $(La_{0.85}Sr_{0.15})_{0.98}MnO_3$ having an average particle size of 20 microns and an electrical conductivity at 800° C. of about 100 S/cm dispersed in 83.2 wt. % of an organic binder comprising the standard bare wire lubricant mentioned above.

Figure 4:
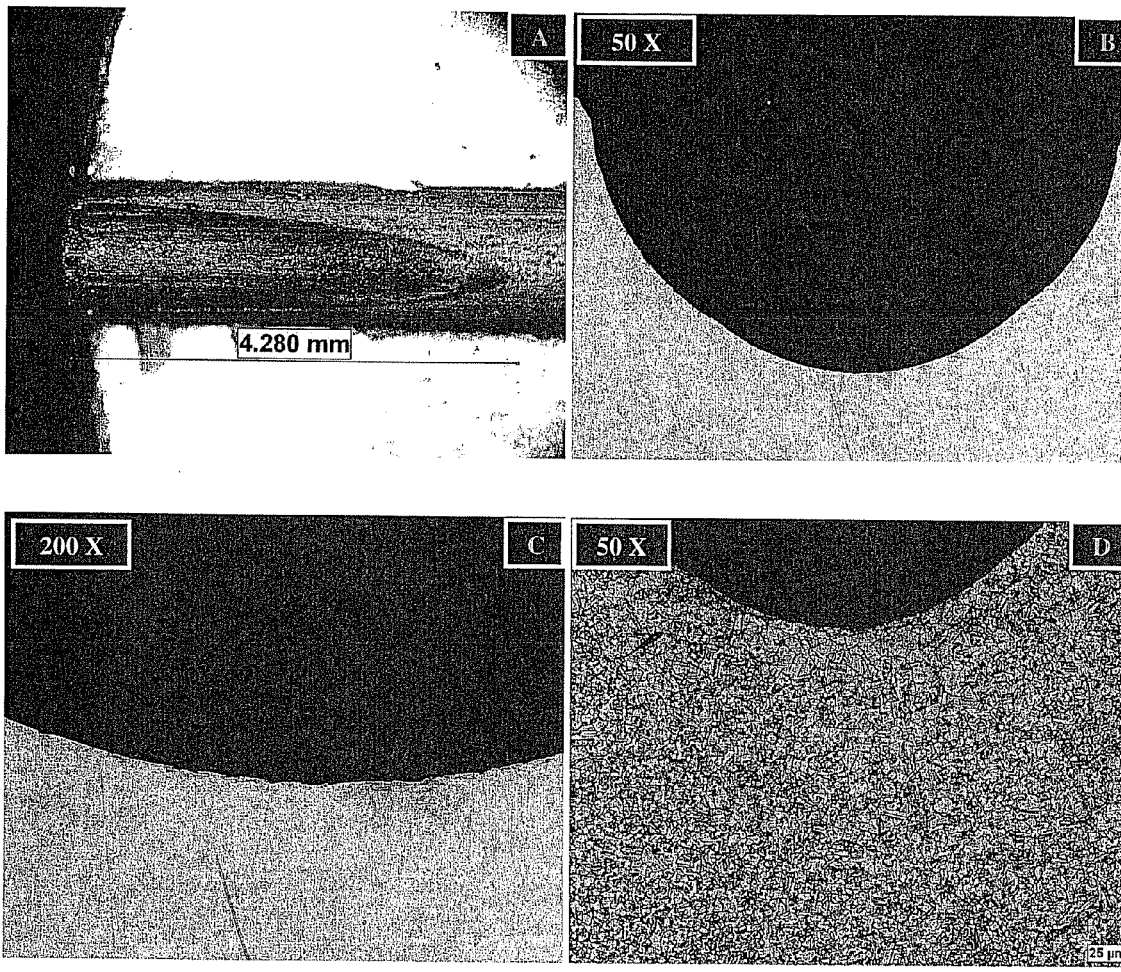

As shown in FIG. 4A, a weld scar ~5 mm long was produced, thereby indicating that the area of contact tip that was affected was almost as large as that occurring in Comparative Example B in which a bare metal wire was tested. However, FIGS. 4B and 4C show that the contact surface remained smooth and free of any added material in much the same way as in Comparative Examples A and C. Moreover, FIG. 4D shows that even fewer large grains were present in the microstructure of the metal forming the contact surface relative to Comparative Example C in which a conventional solid lubricant was used, thereby indicating that the amount of localized heating to above the softening point that occurred in this example was less than occurred in Comparative Example C.

By comparing FIGS. 1B, 1C, 2B, 2C, 3B, 3C, 4B and 4C, it can be seen that, in terms of avoiding generation of a roughened contact surface, the welding wire of this invention (Example 1) works as well as the welding wire of Comparative Example C (unclad/solid lube+bare wire lube) and better than welding wire of Comparative Example B (unclad/bare wire lube). In addition, it also works better than the copper clad/copper lube welding wire of Comparative Example A. In addition, by comparing FIGS. 1D, 2D, 3D and 4D, it can be seen that, in terms of avoiding microstructural damage to the contact tip surface, the welding wire of this invention (Example 1) works essentially as well as the conventional copper clad/copper lube of Comparative Example A and better than the welding wires of Comparative Example B (unclad/bare wire lube) and Comparative Example C (unclad/solid lube+bare wire lube).

Electrical Resistance Measurements

To further demonstrate the effect of the present invention, the voltage drop between the welding wire and the contact tip during each 60 second welding test run of the above working examples was measured and recorded at a data collection rate of 600 Hz. That is, for each test run of each example, voltage drop was automatically measured by computer 600 times per second and recorded, thereby producing 36,000 data points per 60 second test run. Then, all data points for all four or five test runs for each example were combined to provide all the data points for each example, i.e., 146,000 or 180,000 data points per example depending on whether four or five test runs were made for that example. The data was then analyzed to determine the mean voltage drop, the voltage drops at the 25th and 75th percentiles and the variance between the 25th and 75th percentiles. In addition, statistically insignificant data points were identified at voltage levels of greater than 150% of the 75th percentile level and less that 66.7% of the 25th percentile level. The generation of Joule heat for each working example was also calculated according to formula:

$P = I \times V$, where

P=Joule Heat generated, in Watts,
I=Current, in Amps, and
V=Voltage, in Volts

The results obtained are reported in the following Table 2 and visually presented in FIG. 5:

TABLE 2

Voltage Drop from Welding Wire to Contact Tip

| Example | Mean | Voltage Drop, V | | 75/25 Variance | P (Heat) Watts |
| | | 25th percentile | 75th percentile | | |
| --- | --- | --- | --- | --- | --- |
| A (Cu clad/bare wire lube) | 0.075 | 0.046 | 0.100 | 0.054 | ~26 |
| B (unclad/bare wire lube) | 0.145 | 0.104 | 0.193 | 0.89 | ~49 |
| C (unclad/solid lube/bare wire lube) | 0.116 | 0.074 | 0.147 | 0.073 | ~39 |
| 1 (invention) | 0.075 | 0.043 | 0.098 | 0.55 | ~26 |

Figure 5:
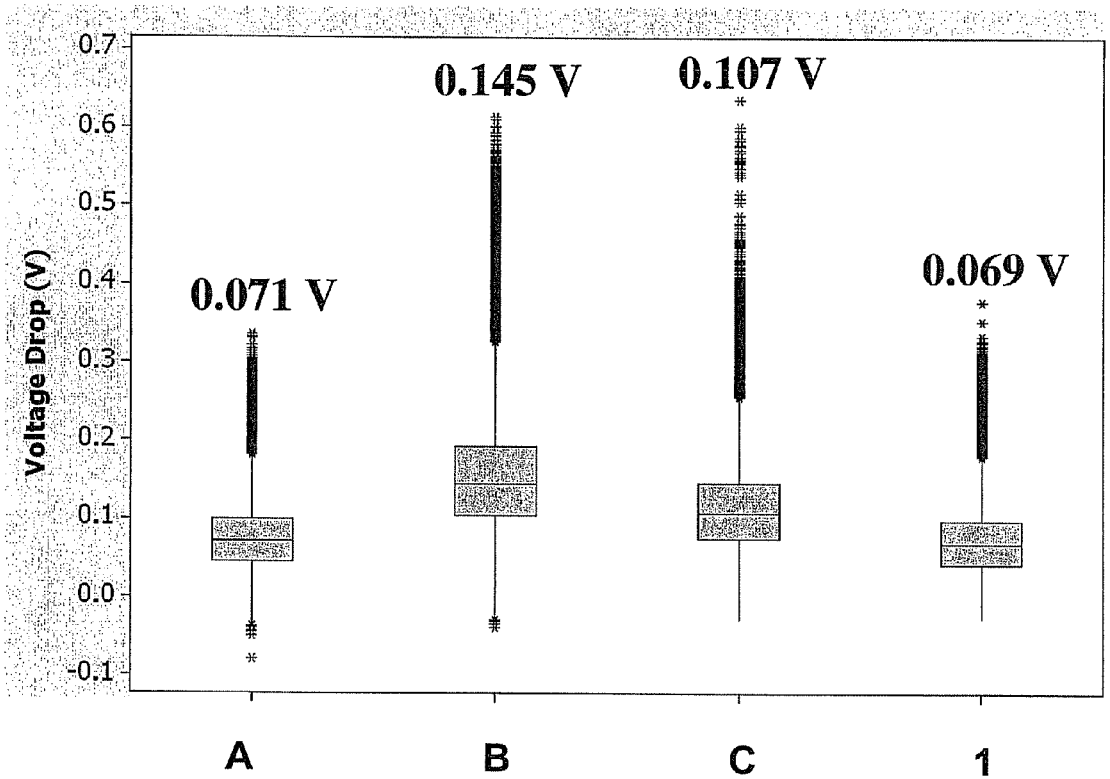
FIG. 5 is a pictorial representation of the results obtained in these working examples in terms of voltage drop and variance in voltage drop.

From Table 2 and FIG. 5 it can be seen that, in terms of mean voltage drop and heat generated, the inventive welding wire of Example 1 performed as good as or better than the copper clad/copper lube welding wire of Comparative Example A and significantly better than the welding wires of Comparative Example B (unclad/bare wire lube) and Comparative Example C (unclad/solid lube+bare wire lube). This suggests that the inventive welding wire will perform at least as well as the conventional copper clad/copper lube welding wire, and significantly better than the conventional solid lubricant coated wire, in terms of avoiding contact tip wear through excessive Joule heating and hence improved contact tip useful life.

Table 2 and FIG. 5 also show that the variance between the 25th and 75th percentile voltage levels generated when the inventive welding wire was used was at least as good as that of the conventional copper clad/copper lube welding wire of Comparative Example A and significantly better than the corresponding values for the conventional welding wires of Comparative Example B (unclad/bare wire lube) and Comparative Example C (unclad/solid lube+bare wire lube). Since the size of the arc created during arc welding is directly proportional to the net applied voltage, this relatively smaller variance in voltage levels generated by the inventive welding wire suggests that it will perform at least as well as the conventional copper clad/copper lube of Comparative Example A and better than welding wire of Comparative Example C (unclad/solid lube+bare wire lube) in terms of arc stability.

Thus, the analytically-determined electrical resistance data discussed immediately above, when considered in combination with the visual evidence of wear reduction discussed above in connection with Example 1 and Comparative Examples A-C, demonstrates that the inventive welding wire performs at least as well as a conventional copper clad/copper lube welding wire, and significantly better than the conventional solid lubricant coated wire, in terms of reducing Joule heat generation in the contact tip, avoiding physical and microstructural damage to the contact tip, and maintaining arc stability. This, in turn, suggests that the inventive welding wire will exhibit a useful life at least as good as that of conventional copper clad welding wire and significantly better than that of welding wire coated with conventional solid feeding lubricants.

Examples 2 and 3 and Comparative Examples D to G

In order to show that the improved results provided by this invention are independent of the particular organic binder used, Example 1 and Comparative Example B were repeated in a series of experiments, some using as the organic binder the same standard bare wire lubricant used in the above Example 1 and Comparative Example B and others using a different bare wire lubricant as the organic binder, in particular Mobil Velocite Oil No. 10 available from Exxon Mobile Corporation of Fairfax, Va., which is a non-aqueous product believed to be severely refined base oil containing stability-enhancing additives. In addition, the following additional changes were also made:

welding was done at about 250 Amps along a 15 foot feeding path with a 180° turn midway through rather at 340 Amps along a straight 6-8 feet feeding path, welding was done for 300 seconds at 350 ipm and 31.7V, data was collected at 750 Hz, the organic feeding lubricant undercoating between the bare wire substrate and the welding wire coating of this invention was omitted, the LSM perovskite solid conductor used was obtained from a different source and had a particle size of ~2µ instead of ~20µ, and the welding wire coatings of this invention were made from 1 gm LSM perovskite solid conductor dispersed in 10 milliliters of the organic binder being tested.

Meanwhile, in order to demonstrate the repeatability of these tests, two otherwise identical control experiments were conducted on different days using copper clad wires identical to those used in the above Comparative Example A (copper clad/copper lube) welded under the same conditions as used in this series of tests.

As in the case of Example 1 and Comparative Example B, the voltage drop between the welding wire and the contact tip during each welding test run was measured, recorded and analyzed to determine the mean voltage drop, the voltage drops at the 25th and 75th percentiles, the variance between the 25th and 75th percentiles, and the generation of Joule heat. The results obtained are reported in the following Tables 3-5 and visually presented in FIG. 6. In these tables, "Lube 1" refers to the standard bare wire lubricant used as the organic binder in the above Example 1 and Comparative Examples A and B, while "Lube 2" refers to the Mobil Velocite Oil No. 10.

TABLE 3

Voltage Drop from Welding Wire to Contact Tip

| | | Voltage Drop, V | | | |
|---|---|---|---|---|---|
| Example | Coating | Mean | 25th percentile | 75th percentile | 75/25 Variance |
| D | Cu Clad Cu Lube | 0.173 | 0.152 | 0.187 | 0.035 |
| E | Cu Clad Cu Lube | 0.163 | 0.127 | 0.189 | 0.062 |
| F | Lube 1 | 0.234 | 0.165 | 0.318 | 0.153 |
| G | Lube 2 | 0.196 | 0.120 | 0.272 | 0.152 |
| 2 | Lube 1 + LSM | 0.137 | 0.112 | 0.153 | 0.041 |
| 3 | Lube 2 + LSM | 0.141 | 0.121 | 0.157 | 0.036 |

TABLE 4

Welding Current

| | | Current, Amps | | | |
|---|---|---|---|---|---|
| Example | Coating | Mean | 25th percentile | 75th percentile | 75/25 Variance |
| D | Cu Clad Cu Lube | 263 | 256 | 270 | 14 |
| E | Cu Clad Cu Lube | 266 | 260 | 271 | 11 |
| F | Lube 1 | 269 | 263 | 274 | 11 |
| G | Lube 2 | 237 | 229 | 246 | 17 |
| 2 | Lube 1 + LSM | 261 | 256 | 267 | 11 |
| 3 | Lube 2 + LSM | 263 | 257 | 269 | 12 |

TABLE 5

Heat/Power to the Contact Tip

| | | Resistance Heating → Current × Voltage, Watts | | | |
|---|---|---|---|---|---|
| Example | Coating | Mean | 25th percentile | 75th percentile | 75/25 Variance |
| D | Cu Clad Cu Lube | 45.5 | 39.6 | 49.4 | 9.8 |
| E | Cu Clad Cu Lube | 43.1 | 33.7 | 49.9 | 16.2 |
| F | Lube 1 | 62.9 | 44.2 | 84.6 | 40.4 |
| G | Lube 2 | 42.6 | 28.5 | 64.2 | 35.7 |
| 2 | Lube 1 + LSM | 35.6 | 29.1 | 40.2 | 11.1 |

TABLE 5-continued

Heat/Power to the Contact Tip

| | | Resistance Heating → Current × Voltage, Watts | | | |
|---|---|---|---|---|---|
| Example | Coating | Mean | 25th percentile | 75th percentile | 75/25 Variance |
| 3 | Lube 2 + LSM | 37.1 | 31.6 | 41.4 | 9.8 |

Figure 6:
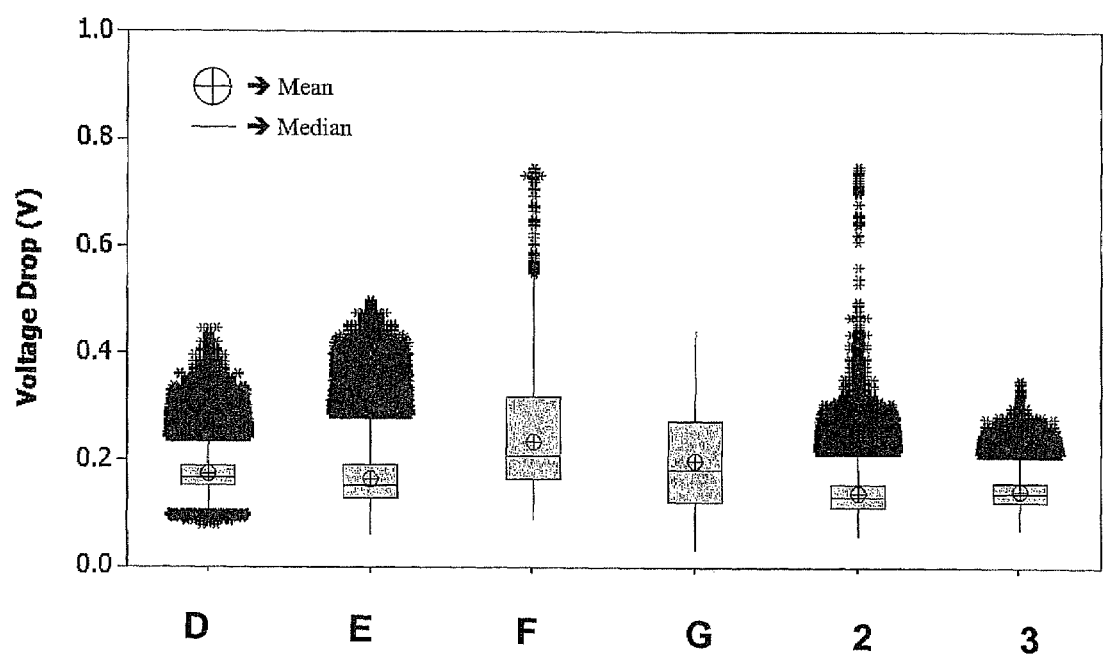
FIG. 6 is a pictorial representation similar to FIG. 5, FIG. 6 illustrating the results obtained in Examples 2 and 3 and Comparative Examples D-G of this specification.

From Tables 3-5 and FIG. 6 it can be seen that the results obtained from the two control experiments, Comparative Examples D and E, although very similar, are not identical. Thus, the variance between these two examples indicates the degree of experimental error inherent in these tests.

Now, by comparing the results obtained for Examples 2 and 3 as reported in Tables 3-5 and visually presented in FIG. 6, it can seen that these results are virtually identical in that the variance between these results is within the experimental error indicated by Comparative Examples D and E. For example, the difference between the mean resistance heating produced in Examples 2 and 3 (37.1−35.6=1.5 Watt) is less than the difference between the mean resistance heating produced in Comparative Examples D and E (45.5−43.1=2.4 Watt). This indicates that, insofar as heat generation is concerned, the results obtained from Examples 2 and 3 are within the experimental error of these tests, and hence identical.

On the other hand, the variance between the 25th and 75th percentile voltage levels generated when Lube 2 (Mobil Velocite Oil No. 10) was used was slightly better than the voltage variance obtained when Lube 1 (standard bare wire lubricant used in above Example 1) was used. These results show that Lube 2 (Mobil Velocite Oil No. 10) is at least as good as Lube 1 (standard bare wire lubricant used in above Example 1) in terms of the advantageous results realized by this invention.

Although only a few embodiments of this invention have been described above, it should be appreciated that many modifications can be made without departing from the spirit and scope of the invention. All such modifications are intended to be included within the scope of the present invention, which is to be limited only by the following claims:

The invention claimed is:

1. Welding wire for use in arc welding comprising a welding wire substrate having surfaces and a coating on the surfaces of the welding wire substrate, the coating comprising (a) 0.001 to 10 gms/m2 of welding wire surface area of electrically conductive thermally stable solid particles, and (b) 60 to 98 wt. % of the coating of an oil or wax organic binder, wherein the electrically conductive thermally stable solid particles
   (i) have an average particle size of ahem 40 microns or less,
   (ii) remain solid and do not melt at a temperature of 1200° C.,
   (iii) are unreactive in air at 1200° C. as determined by Thermal Gravimetric Analysis according to ASTM E2550-07,
   (iv) exhibit an electrical conductivity of at least about 10 S/cm at 800° C., and
   (v) comprise a perovskite corresponding to the formula ABOx, wherein
   either
   (A) A is at least one element selected from rare earth, alkaline earth, alkali, Pb+2 and Bi+3, and B is at least one element selected from Li+, Cu+2, Mg+2, Ti+3, V+3, Cr+3, Mn+3, Fe+3, Co+3, Ni+3, Rh+3, Ti+4, Mn+4, Ru+4, pt+4, Nb+5, Ta+5, Mo÷6 and W+6, or (B) A is at least one of La, Ce, Pr, Sm, Nd, Gd and Y, B is at least one of Ga, Mg, Mn, Fe, Cr, Co, Cu, Zn and Ni, and x is 2.5-3.2, and wherein A is optionally partially substituted with one or more of Sr, Ba and Ca.

2. The welding wire of claim 1, wherein the thermally stable electrically conductive solid particles have an electrical conductivity of at least 50 S/cm at 800° C.

3. The welding wire of claim 1, wherein the perovskite corresponds to the formula $ABO_x$, wherein
A is at least one element selected from rare earth, alkaline earth, alkali, $Pb^{+2}$ and $Bi^{+3}$, and
B is at least one element selected from Li+, $Cu^{+2}$, $Mg^{+2}$, $Ti^{+3}$, $V^{+3}$, $Cr^{+3}$, $Mn^{+3}$, $Fe^{+3}$, $Co^{+3}$, $Ni^{+3}$, $Rh^{+3}$, $Ti^{+4}$, $Mn^{+4}$, $Ru^{+4}$, $Pt^{+4}$, $Nb^{+5}$, $Ta^{+5}$, $Mo^{+6}$ and $W^{+6}$.

4. The welding wire of claim 1, wherein the perovskite corresponds to the formula $ABO_x$, wherein
A is at least one of La, Ce, Pr, Sm, Nd, Gd and Y,
B is at least one of Ga, Mg, Mn, Fe, Cr, Co, Cu, Zn and Ni, and
x is 2.5-3.2,
wherein A is optionally partially substituted with one or more of Sr, Ba and Ca.

5. The welding wire of claim 1, wherein the binder is a vegetable oil, mineral oil, synthetic oil, petroleum wax or mixture thereof.

6. The welding wire of claim 1, wherein the welding wire has a solid core and is essentially free of copper cladding.

7. The welding wire of claim 1, wherein the welding wire has a flux core.

8. The welding wire of claim 1, wherein the welding wire coating comprises 1 to 20 wt. % solid lubricant and 1 to 20 wt. % electrically conductive thermally stable solid particles.

9. The welding wire of claim 1, wherein the electrically conductive thermally stable solid particles do not melt at 1,600° C. and, in addition are essentially unreactive in air at 1,600° C. as determined by Thermal Gravimetric Analysis according to ASTM E2550-07.

10. The welding wire of claim 1, wherein the welding is not copper clad.

11. The welding wire of claim 1, wherein the thermally stable solid particles have an average particle size of 40 microns or less.

12. The welding wire of claim 2, wherein the thermally stable electrically conductive solid particles have an electrical conductivity of at least 75 S/cm at 800° C.

13. The welding wire of claim 3, wherein A is at least one element selected from the group consisting of Na+, K+, Rb+, Ag+, $Ca^{+2}$, $Sr^{+2}$, $Ba^{+2}$, $Pb^{+2}$, $La^{+3}$, $Pr^{+3}$, $Nd^{+3}$, $Bi^{+3}$, $Ce^{+4}$ and $Th^{+4}$.

14. The welding wire of claim 6, wherein the electrically conductive thermally stable solid particles have an average particle size of 2 to 20 microns.

15. The welding wire of claim 6, wherein the electrically conductive thermally stable solid particles have an electrical conductivity of at least 50 S/cm at 800° C.

16. The welding wire of claim 8, wherein the solid lubricant is at least one of $MoS_2$, $WS_2$, ZnO, graphite and PTFE (Teflon).

17. The welding wire of claim 11, wherein the thermally stable solid particles have an average particle size of 20 microns or less.

18. The welding wire of claim 15, wherein the perovskite corresponds to the formula $ABO_x$, wherein
A is at least one element selected from rare earth, alkaline earth, alkali, $Pb^{+2}$ and $Bi^{+3}$, and
B is at least one element selected from Li+, $Cu^{+2}$, $Mg^{+2}$, $Ti^{+3}$, $V^{+3}$, $Cr^{+3}$, $Mn^{+3}$, $Fe^{+3}$, $Co^{+3}$, $Ni^{+3}$, $Rh^{+3}$, $Ti^{+4}$, $Mn^{+4}$, $Ru^{+4}$, $Pt^{+4}$, $Nb^{+5}$, $Ta^{+5}$, $Mo^{+6}$ and $W^{+6}$.

19. The welding wire of claim 15, wherein the perovskite corresponds to the formula $ABO_x$, where
A is at least one of La, Ce, Pr, Sm, Nd, Gd and Y,
B is at least one of Ga, Mg, Mn, Fe, Cr, Co, Cu, Zn and Ni, and
x is 2.5-3.2,
wherein A may be optionally partially substituted with one or more of Sr, Ba and Ca.

20. The welding wire of claim 17, wherein the thermally stable solid particles have an average particle size of 10 microns or less.

21. The welding wire of claim 20, wherein the thermally stable solid particles have an average particle size of 5 microns or less.

22. The welding wire of claim 21, wherein the thermally stable solid particles have an average particle size of 5 microns or less.

23. A welding wire coating composition comprising (a) thermally stable electrically conductive solid particles, and (b) 60 to 98 wt. % of the coating composition of an oil or wax organic binder, wherein the thermally stable electrically conductive solid particles
(i) have an average particle size of 40 microns or less,
(ii) remain solid and do not melt at a temperature of 1200° C.,
(iii) are unreactive in air at 1200° C. as determined by Thermal Gravimetric Analysis according to ASTM E2550-07,
(iv) exhibit an electrical conductivity of at least about 10 S/cm at 800° C., and
(v) comprise a perovskite corresponding to the formula ABOx, wherein either
(A) A is at least one element selected from rare earth, alkaline earth, alkali, Pb+2 and Bi+3, and B is at least one element selected from Li+, Cu+2, Mg+2, Ti+3, V+3, Cr+3, Mn+3, Fe+3, Co+3, Ni+3, Rh+3, Ti+4, Mn+4, Ru+4, pt+4, Nb+5, Ta+5, Mo+6 and W+6, or (B) A is at least one of La, Ce, Pr, Sm, Nd, Gd and Y, B is at least one of Ga, Mg, Mn, Fe, Cr, Co, Cu, Zn and Ni, and x is 2.5-3.2, and wherein A is optionally partially substituted with one or more of Sr, Ba and Ca.

24. The welding wire coating composition of claim 23 comprising 1 to 20 wt. % solid lubricant and 1 to 20 wt. % electrically conductive thermally stable solid particles.

25. The welding wire coating composition of claim 23, wherein the electrically conductive thermally stable solid particles do not melt at 1,600° C. and, in addition, are essentially unreactive in air at 1,600° C. as determined by Thermal Gravimetric Analysis according to ASTM E2550-07.

26. The welding wire coating composition of claim 24, wherein the solid lubricant is at least one of $MoS_2$, $WS_2$, ZnO, graphite and PTFE (Teflon).

27. The welding wire coating composition of claim 24, wherein the electrically conductive thermally stable solid particles have an electrical conductivity of at least 50 S/cm at 800° C.

* * * * *